Nov. 7, 1961  J. C. BRENEMAN  3,007,430
BUOY DRIVEN PUMP
Filed Oct. 14, 1959  2 Sheets-Sheet 1
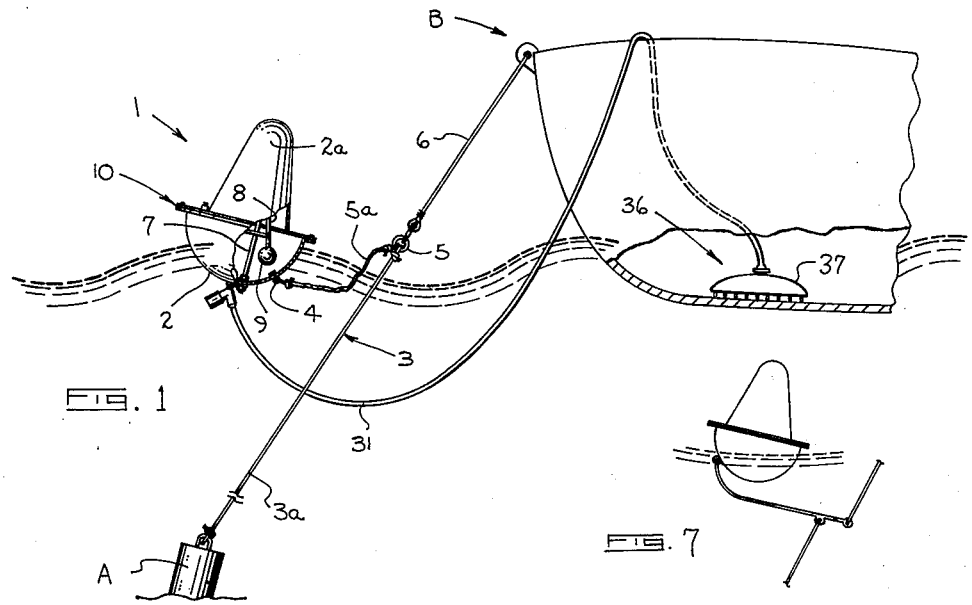
FIG. 1
FIG. 7
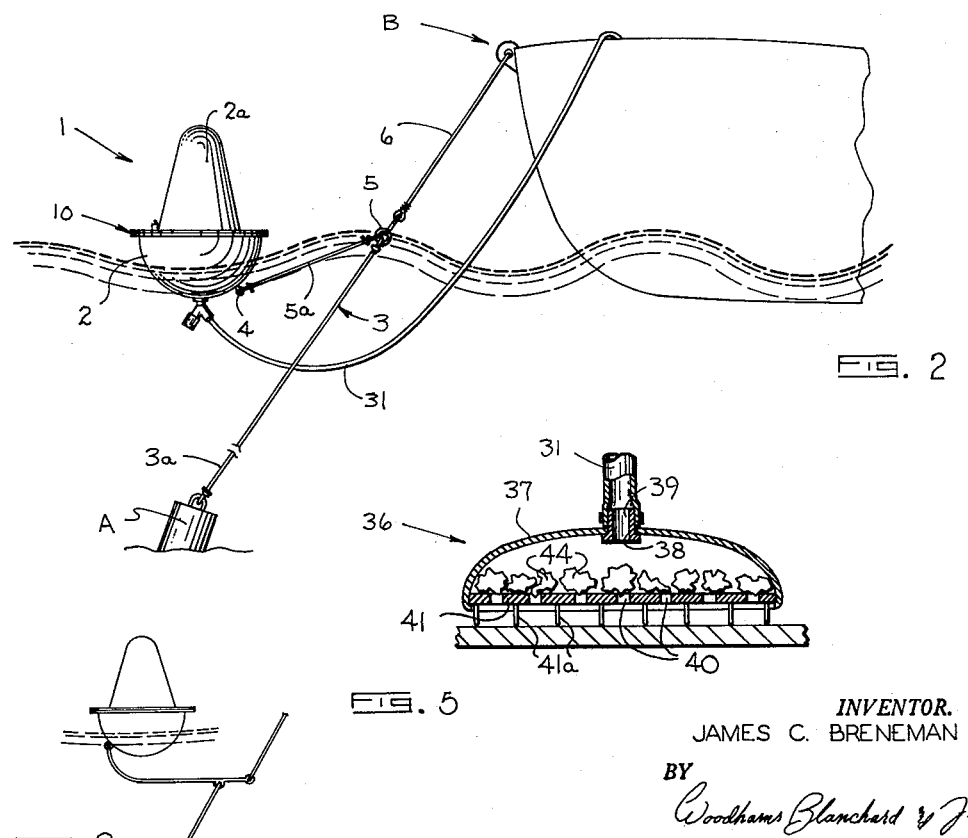
FIG. 2
FIG. 5
FIG. 8
INVENTOR.
JAMES C. BRENEMAN
BY
Woodhams Blanchard & Flynn
ATTORNEYS Nov. 7, 1961    J. C. BRENEMAN    3,007,430
BUOY DRIVEN PUMP
Filed Oct. 14, 1959    2 Sheets-Sheet 2
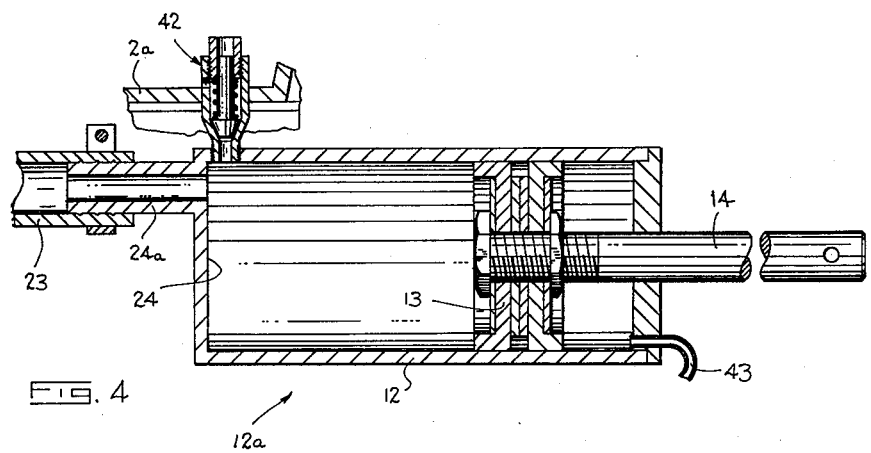
INVENTOR.
JAMES C. BRENEMAN
BY
Woodhams Blanchard & Flynn
ATTORNEYS

United States Patent Office 3,007,430
Patented Nov. 7, 1961

3,007,430
BUOY DRIVEN PUMP
James C. Breneman, Galesburg, Mich., assignor to Innoventions, Inc., Kalamazoo, Mich., a corporation of Michigan
Filed Oct. 14, 1959, Ser. No. 846,449
9 Claims. (Cl. 114—183)

This invention relates to pump equipment, and it relates particularly to a device utilizing wave action to operate a pump for removing bilge water from relatively small boats.

It has long been a common practice to moor relatively small boats, such as the 15 to 35 foot sizes, to buoys in deep water and such boats are often left at such moorings for long periods of time. During such time bilge water collects therein for a variety of reasons which are well known and understood. In boats of such size, it is not practicable to provide inboard machinery for keeping the bilge dry, due to the well-known problems of cost, supervision, control and other related factors. Accordingly, such water is merely permitted to collect and is then pumped out when the boat is about to be used. This is at best a nuisance because the pumping out of the bilge must precede the use of a boat and it correspondingly delays such use. In other cases, where bilge water collects rapidly, either through leaking or because of rain, serious damage may be done by excessively deep bilge water to machinery or to other equipment and fittings within the boat.

Accordingly, the objects of the invention are:

(1) To provide a device utilizing wave action for operating a bilge pump in a boat of moderate size.

(2) To provide apparatus, as aforesaid, which will utilize the relative motion between the boat and a buoy to which the boat is moored for activating said pump.

(3) To provide apparatus, as aforesaid, which will respond to relatively small wave action and hence be effective over the majority of the time that a boat is moored.

(4) To provide apparatus, as aforesaid, which will be reliable in operation over a long period of time without attendance of an operator and without other appreciable maintenance.

(5) To provide apparatus, as aforesaid, which will be relatively inexpensive to manufacture and distribute, and which can accordingly be sold at a price low enough to render it attractive to a substantial market.

(6) To provide apparatus, as aforesaid, which will be sufficiently small that it can be utilized with a buoy of acceptable size, such acceptability being considered both from the standpoint of weight and the consequent ease of handling thereof, and also from the standpoint of appearance and cost.

Other objects and purposes of the invention will be apparent to persons acquainted with equipment of this general type upon reading the following description and an inspection of the accompanying drawings.

In the drawings:

FIGURE 1 is a side elevational view of a device embodying the invention and including a buoy in association with a broken fragment of a boat moored thereto.

FIGURE 2 is a side elevational view of said device of the invention with the buoy in a different position of operation.

FIGURE 3 is a broken, side elevational view of a fragment of FIGURE 2 including the buoy.

FIGURE 4 is a vertical, central section of the pump mechanism in the buoy.

FIGURE 5 is a sectional view taken along the line V—V in FIGURE 1.

FIGURE 6 is an enlarged central section of a fragment of FIGURE 3 including the valving.

FIGURE 7 discloses said buoy with modified mooring connections.

FIGURE 8 is the buoy of FIGURE 7 in a different position.

General description

In general, the invention consists of a somewhat rounded buoy capable of easy rocking in the water in response to the wave action and in response to relative, vertical movement between said buoy and the boat moored thereto. More specifically, a line from the boat is so fastened to the anchor cable of the buoy, that even a mild wave action will cause the buoy to rock into and out of a slightly listing position. A pendulum within the buoy responds to such rocking motion by a swinging motion relative to the buoy frame and thereby operates a pump. Suitable conduits connect the pump to the bilge of the boat for pumping water out therefrom.

Detailed description

As shown in FIGURE 1, a buoy 1 having a hollow, hemispherical shell or base 2 is secured to an anchor cable 3 by means of a mooring eye 4 which is affixed to the lower side of said shell 2 at a point spaced circumferentially from the center of its hemispherical surface. The buoy also includes a cone-shaped, upstanding cap member 2a which is mounted upon and covers the shell 2. A mooring line 6 is connected between the prow of the boat B and a ring 5 on the anchor cable. The portion 5a of cable 3, between the ring 5 and mooring eye 4, is preferably short so that the buoy is urged into a substantially upright condition, as shown in FIGURES 2 and 3, when the line 6 and the lower portion 3a of cable 3 are substantially taut between the boat and the anchor A. Accordingly, when a swell raises the buoy portion 5a of cable 3 goes slack and permits the buoy to rock into its normal, listing position of FIGURE 1.

An upright post 7 is mounted within the shell 2, at a point on the inner surface thereof, which point is spaced from the center of said inner surface toward the mooring eye 4, and extends upwardly therefrom to a point somewhat above the rim 10 at the upper edge of the shell. A pendulum 8 having a weight 9 on the lower end thereof is pivoted at its upper end 11 to the upper end of said post 7.

A pump 12a (FIGURE 4) is disposed in the shell 2 and comprises a pump housing 12 having a reciprocable piston 13 (FIGURE 4) therein operated by the reciprocable piston rod 14. Said pump housing 12 is mounted rigidly with respect to said shell 2, preferably by mounting same through a bracket 18 onto the post 7. Said rod 14 is affixed to the pendulum 8 in any convenient manner, such as by means including the pivoted link 21, in order that oscillatory motion of the pendulum about its pivotal mounting will result in reciprocable movement of the piston rod 14 and pump piston 13.

The Y-shaped fitting 22 (FIGURES 3 and 6), has an upwardly projecting pipe 23a which extends through and is mounted upon the shell 2, and is connected by a suitable conduit 23 to that end 24 of the pump 12a opposite the rod 14. The fitting 22 has two downwardly projecting pipes or branches 29 and 32 which include check valves 25 and 26 (FIGURE 6). While the check valves may be of any convenient type, the valve 26 is comprised of a ball 27 which is held in the valve seat 27a by a plurality of pins 27b. The valve 26 is sensed in a well-known manner so that upward flow through the valve and the conduit 23 is permitted but the reverse flow is prevented.

The valve 25 (FIGURE 6) is comprised of a resilient diaphragm which engages an annular seat 25a surrounding the lower end of the branch 32. The valve 25 has a stem 28 which is secured to the center of the diaphragm and to the bar 28a in the lower end of the branch 32. The valve 25 is accordingly sensed so that water can flow downwardly and out therethrough but cannot flow upwardly and in through it. Thus, rightward movement (FIGURE 4) of the pump piston 13 will cause the pump 12a to draw water into said pump through the check valve 26 (FIGURE 6) while the check valve 25 prevents entry of fluid flow therethrough. Subsequent movement of the pump piston 13 in the opposite direction will cause the pump to drive water out through the valve 25, and the check valve 26 will prevent said water from going out therethrough into the conduit 31 associated therewith.

The branch 29 of the Y-fitting associated with the check valve 26 is connected to the conduit 31 which extends into the boat B, and the branch 32 of said Y-fitting discharges to any point outside of the shell 2 of the mooring buoy 1. Thus, operation of the pump 12a will first draw water from the boat into said pump which will then discharge the water outwardly past the check valve 25.

The conduit 31 (FIGURE 5) extending into the boat bilge is affixed at the intake end thereof to a strainer head 36 of any convenient type. While the strainer may be one of several different types, it has been found that the particular type disclosed herein is especially useful because of its self-cleaning feature. It is well known that bilge water contains many impurities which can quickly clog a pumping system of this type and particularly the intake head thereof.

The strainer 36 is comprised of a dome-shaped housing 37 which has a central opening 38 through the central portion thereof. A fitting 39 is arranged through said opening and connects with said intake conduit 31. A strainer plate 41 extends across the lower side of the housing 37 and has a plurality of relatively large, spaced openings 40. The plate 41, hence the housing 37, is spaced upwardly from the floor of the boat B by a plurality of spaced fingers 41a which are secured to, and extend downwardly from, the plate 41 between the openings 40. The fingers 41a not only hold the plate away from the floor, but also prevent large materials from engaging the lower surface of the plate 41 and thereby blocking the openings 40 therein.

The space above said plate and within the zone defined by said housing is partially filled with relatively large chunks of a solid material, such as marble chips or stones 44 which will move vigorously in response to the flow of water past them and thereby loosen and/or dislodge debris from the openings 40 in the plate 41.

A relief valve 42 is provided in the pump housing 12 primarily to relieve air from the system, but it is set so that small spurts of water may be ejected therethrough by normal operation of the pump. A drain 43 discharges to the outside of the shell 2 any leakage past the pump piston 13. The stroke of the piston 13 is controlled so that it stops short of the left end 24 (FIGURE 4) of the pump housing 12. The port 24a through the left end 24 is near the upper edge thereof. Thus, some water will normally remain in the housing 12 at all times to keep the piston seals moist.

*Operation*

While the operation of the apparatus has been somewhat indicated in connection with the above description, it will be set forth fully in the interest of insuring full understanding of the invention.

As the buoy 1 (FIGURES 1 and 2) responds to wave action, it will move vertically with respect to the boat B, which is connected to the mooring buoy. Such motion will provide an intermittently applied, upward and sideward pull on the mooring line 6 which, acting through the mooring eye 4, will effect a rocking motion of the buoy 1. Due to the inertia of the weight 9 at the lower end of the pendulum 8, this oscillatory rocking motion of the buoy will effect an oscillatory swinging motion of the pendulum around the pivot 11 with respect to said buoy and with respect to the post 7 upon which the pendulum is mounted. Since the pump 12 is mounted fixedly with respect to said post 7, this motion of the pendulum will result in reciprocal movement of the pump rod 14 and of the piston 13 with respect to the pump housing 12. Accordingly, water will be drawn from the boat through the strainer 36, the intake conduit 31, the check valve 26, the conduit 23 and into the pump housing on the rightward (as appearing in FIGURE 4) stroke of said pump. Such water will then be expelled from said housing through the conduit 31 and the check valve 25 upon a leftward stroke of said pump. Trash and other solid materials in the boat bilge will be largely stopped from entering into the intake conduit 31 by the strainer 36 and the fingers 41a thereon. While said strainer 36 may need periodic cleaning, the chips 44 will by their movement within the strainer, tend to keep said strainer in water-passing condition for substantial periods, which periods will be amply long to insure safe care of the boat by the pumping equipment within the mooring buoy. By locating the two check valves close to each other, as shown, and at a substantial distance below the pump, relatively little of the water from the bilge will enter into the pump. Instead water in the upper part of the conduit 23 will merely move with the pump piston into and out of the housing 12, and the dirt therein will largely settle out and be expelled through the valve 25 after a short period of operation. The relief valve 42 on the outside of the buoy shell 2 will discharge small visible spurts of water which will indicate that the pump operates satisfactorily.

FIGURES 7 and 8 disclose a buoy 50, which may be substantially identical to the buoy 1, but which has a modified type of mooring connection. That is, the mooring eye 51 on the buoy 50 is pivotally connected to one end of a rod 52. The other end of the rod 52 has a ring 53 engageable by a fastener at the end of the mooring line 54. The rod 52 also has a ring 56 secured thereto at a point near to, but spaced a short distance from, the ring 53. The anchor cable 57 is connected at its upper end to the ring 56. The end of the rod 52 adjacent to the buoy 50 may be curved slightly upwardly to avoid engagement with the lower side of the buoy when in the FIGURE 7 position.

The buoy 50 is connected by the rod 52, the cable 57 and the line 54 to an anchor and a boat, such as those shown at A and B, respectively, in FIGURE 1. The cable 57 and line 54 will soon become reasonably tight due to the usual action of the water and wind upon the boat. Thereafter, any force produced by wind or waves, which tends to move the boat away from the anchor, will pivot the rod 52 around the ring 56 and thereby rock the buoy 50. Moreover, any wave action upon the buoy 50 will also rock the buoy around the mooring eye 4. Thus, this arrangement is capable of causing more movement of the buoy, hence a greater pumping action.

It will be recognized that many of the details of equipment specifically shown herein are by way of example only and particularly it will be recognized that the details of the valving system and the details of the pumping mechanism may be widely modified within the scope of the invention. Further, it will be recognized that many other modifications may be made within the scope of the invention and that accordingly the hereinafter appended claims will be considered to include such modifications excepting as said claims by their own terms require otherwise.

What is claimed is:

1. In a combined mooring and pumping device for a boat, the combination comprising: a mooring buoy including a hollow, substantially cup-shaped and upwardly opening shell for supporting the buoy in the water; connecting means connected to and between said buoy and said boat, said connecting means being arranged so that relative movement between said boat and said buoy in response to wave action effects a rocking of said buoy; means including a pendulum mounted within said buoy and a pump activated by movement of said pendulum with respect to said buoy in response to said movement of said buoy; an intake conduit and a discharge conduit operatively associated with said pump, said intake conduit being positionable to have its free end placed within the bilge of the boat fastened to said buoy.

2. The device defined in claim 1 wherein a post is arranged eccentrically within said shell and extends from a point spaced along the surface of said shell from said connecting means and extends past the center of said shell; and wherein the upper end of said pendulum is pivotally mounted to the upper end of said post.

3. The device defined in claim 1 wherein said pump is of the reciprocable type and has one of its housing and the plunger affixed rigidly with respect to the buoy and the other of said plunger and said housing connected to said pendulum in such manner that said movement of said pendulum with respect to said buoy effects reciprocal pumping movement of said pump.

4. In a combined mooring and pumping device for a boat, the combination comprising:

- a mooring buoy including a hollow, substantially hemispherical shell;
- anchor connecting means connected to said buoy and means on said buoy for mooring said boat to said buoy, said mooring means being positioned on said buoy at a point on the lower side of said shell spaced circumferentially from the center of said lower side so that relative movement between said boat and said buoy in response to wave action effects a rocking of said buoy;
- a pendulum and means supporting said pendulum within said buoy so that said buoy normally tends to list toward said point, whereby action of said buoy in response to waves will cause said mooring means to apply a sideward and upward lift onto the buoy and thereby effect a strong rocking motion of said buoy;
- a pump activated by movement of said pendulum with respect to said buoy in response to movement of said buoy;
- an intake conduit and a discharge conduit operatively associated with said pump, said intake conduit being positionable to have its free end placed within the bilge of the boat fastened to said buoy.

5. The structure of claim 1 wherein said connecting means is secured to said buoy at a point on said shell spaced circumferentially from the center of said shell and wherein the pendulum is disposed within the buoy so that said movement of said pendulum is toward and away from said point, whereby the action of said boat in response to wave motion will cause said connecting means to apply an upward and downward movement to the buoy at said point and thereby effect a strong rocking motion of said buoy.

6. In a combined boat mooring and pumping device, the combination comprising:

- a buoy having a hollow, substantially cup-shaped and upwardly opening base for supporting said buoy in the water;
- a connecting means secured to said boat and connected to said buoy at a first point thereon spaced from the normal low point of said base;
- a post mounted in said base and extending substantially diametrically from a second point located on said base near said low point, said second point being spaced circumferentially from said first point;
- a pendulum fastened at its upper end to said post near its upper end for pivotal movement with respect to said post toward and away from said first point upon rocking movement of said buoy in response to rocking of said boat by wave motion;
- a reciprocable pump mounted in said buoy and operably connected to said pendulum for effecting a pumping operation in response to movement of said pendulum;
- a first conduit from said pump having an inlet end extendable into said boat and having a check valve therein permitting movement of fluid therethrough only in a direction toward said pump, and an outlet conduit communicating with said first conduit between said pump and said check valve and extending to a point of discharge;
- and a check valve in said outlet conduit permitting movement of fluid therethrough only in a direction away from said pump;
- whereby normal relative motion of said buoy with respect to said boat in response to wave action effects oscillation of said pendulum and thereby effects operation of said pump.

7. In a combined mooring and pumping device for a boat, the combination comprising: a mooring buoy including a hollow, floatable vessel having an external, water engaging surface for supporting the buoy in the water; connecting means connected to and between said buoy and said boat, said connecting means being arranged so that relative movement between said boat and said buoy in response to wave action effects a rocking of said buoy; means including a pendulum mounted within said buoy and a pump activated by movement of said pendulum with respect to said buoy in response to said movement of said buoy; an intake conduit and a discharge conduit operatively associated with said pump, said intake conduit being positionable to have its free end placed within the bilge of the boat fastened to said buoy.

8. In a combined mooring and pumping device for a boat, the combination comprising: a mooring buoy having a hollow, substantially hemispherical shell portion for supporting said buoy in the water; anchor engaging means connected to said buoy at a connecting point on said shell spaced circumferentially from the normal low point on the lower side of said shell; mooring means for connecting said engaging means to a boat so that movement of said buoy with respect to said engaging means due to wave action effects a rocking movement of said buoy in the water; a pendulum and means supporting said pendulum within said buoy for movement substantially within an upright plane passing through said connecting point, said pendulum being arranged so that said buoy normally tends to list in a direction substantially within said plane, whereby said movement of said buoy in response to wave action causes said engaging means to effect said rocking movement of said buoy and said movement of said pendulum; a pump activated by said movement of said pendulum with respect to said buoy in response to said movement of said buoy; and an intake conduit and a discharge conduit operatively associated with said pump, said intake conduit being positionable to have its free end placed within the bilge of the boat fastened to said buoy.

9. The structure of claim 8 wherein said engaging means includes an elongated, rigid member connected near one end to said buoy at said connecting point thereon and near the other end to said mooring means, and an elongated, flexible element connected to said member near said mooring means and spaced therefrom.

References Cited in the file of this patent

UNITED STATES PATENTS

| | | |
|---|---|---|
| 631,178 | Redding | Aug. 15, 1899 |
| 1,828,821 | Short et al. | Oct. 27, 1931 |
| 1,877,210 | Von Kohler | Sept. 13, 1932 |
| 2,068,653 | Brynild | Jan. 26, 1937 |
| 2,173,207 | Larsson | Sept. 19, 1939 |
| 2,478,217 | Walters et al. | Aug. 9, 1949 |